Nov. 17, 1953  L. KATZ  2,659,162
TURBULENT FLOW, RESTRICTED PASSAGE DRIER
Filed Feb. 17, 1950  4 Sheets-Sheet 1
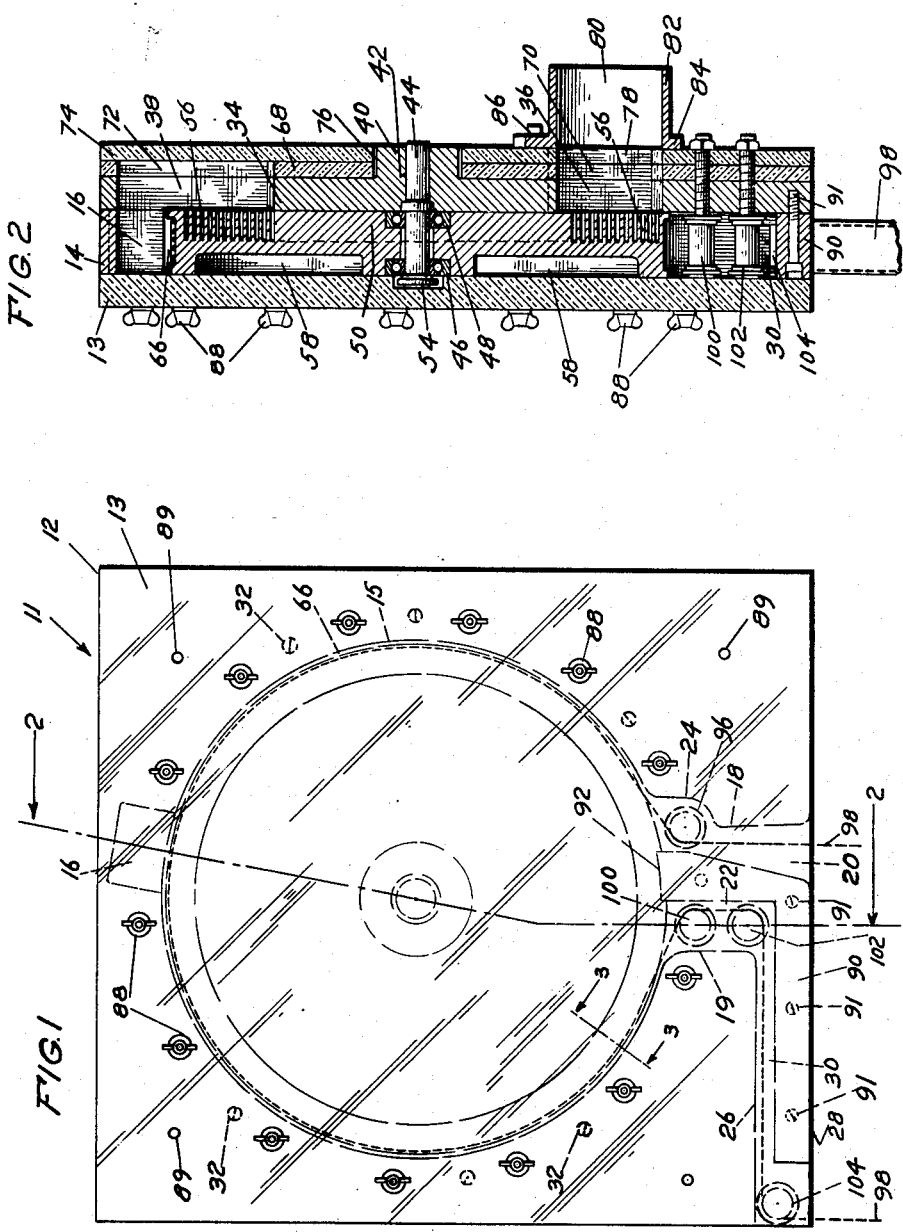
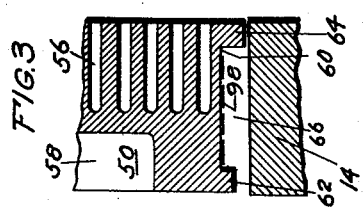
INVENTOR
LEONHARD KATZ
BY
ATTORNEY Nov. 17, 1953   L. KATZ   2,659,162
TURBULENT FLOW, RESTRICTED PASSAGE DRIER
Filed Feb. 17, 1950   4 Sheets-Sheet 2
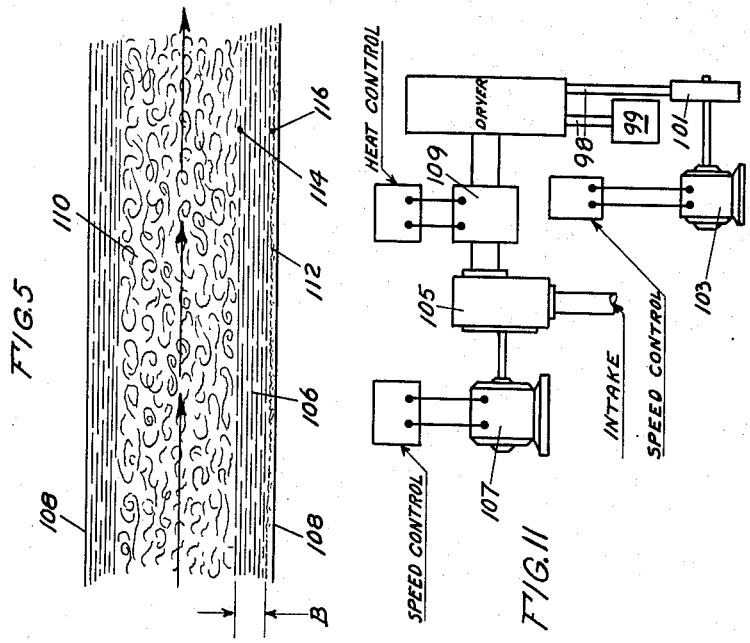
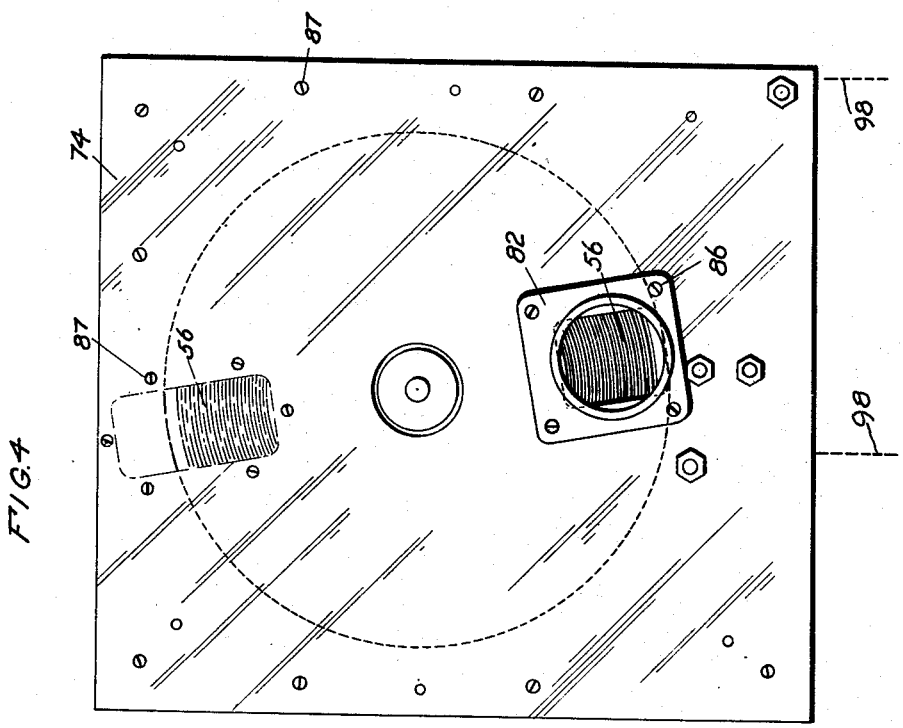
INVENTOR
LEONHARD KATZ
BY
ATTORNEY Nov. 17, 1953  L. KATZ  2,659,162
TURBULENT FLOW, RESTRICTED PASSAGE DRIER
Filed Feb. 17, 1950  4 Sheets-Sheet 3
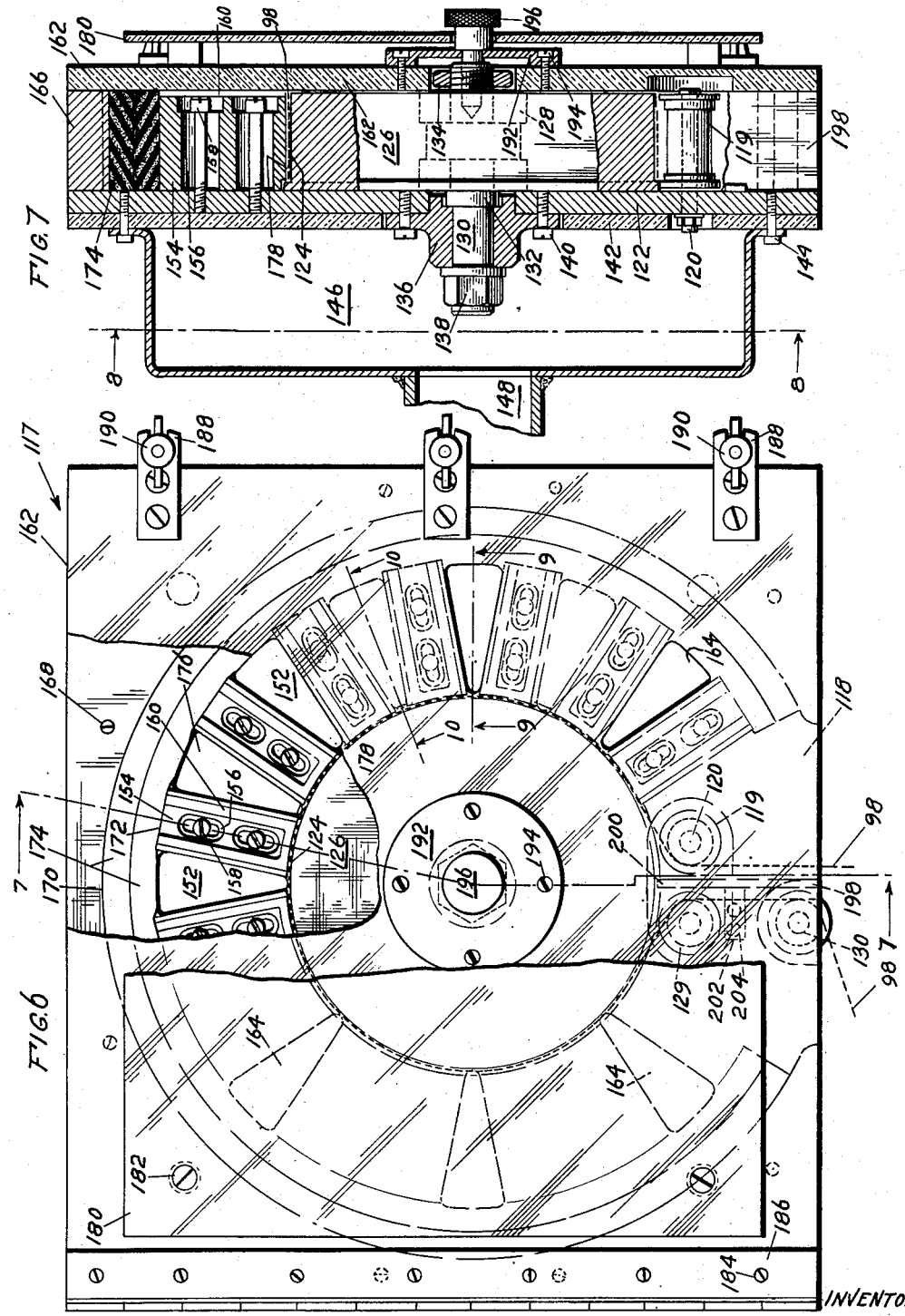

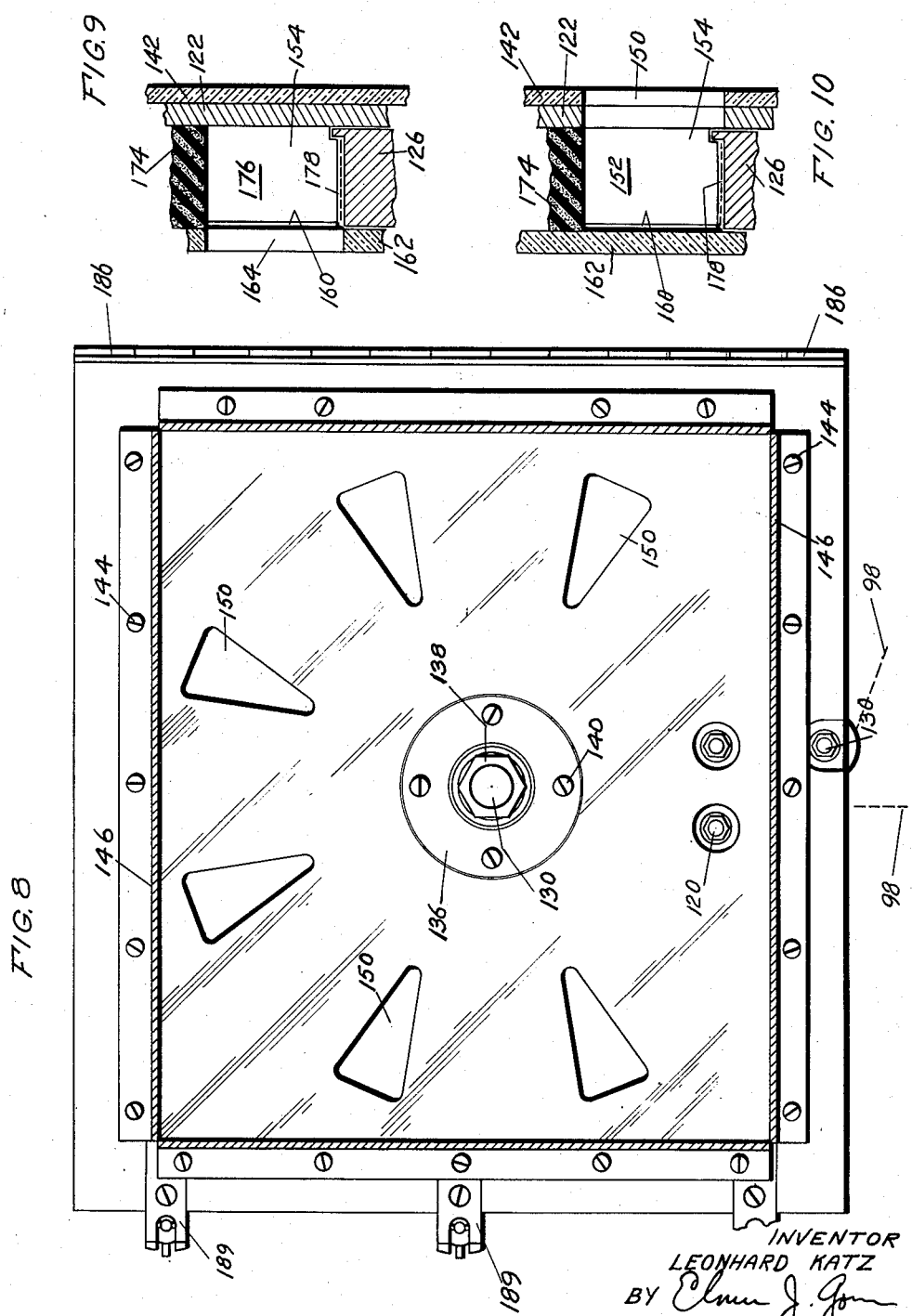

Patented Nov. 17, 1953

2,659,162

UNITED STATES PATENT OFFICE 2,659,162

TURBULENT FLOW, RESTRICTED PASSAGE DRIER

Leonhard Katz, Woburn, Mass., assignor to Raytheon Manufacturing Company, Newton, Mass., a corporation of Delaware Application February 17, 1950, Serial No. 144,829

5 Claims. (Cl. 34—122)

This invention relates to rapid drying of a wet body by exposing it to the flow of a turbulent drying medium in a restricted passage.

In the past, to increase the rate of drying of a wet material, one or more of several practices have generally been followed. Either the temperature of the wet material, or the temperature of the air surrounding the wet material, has been greatly increased; or another practice, wherein large volumes of relatively unrestricted air at high temperatures and moving at relatively low velocities, has sometimes been used.

While these practices increase the rate of drying somewhat, they are unsatisfactory in many instances. For example, many substances become physically damaged when subjected to high temperatures or to wide variations in temperature. Also, air at small distance from the surface of the wet material contributes little or nothing to the rate of drying; thus much of the air moved in the above manner is wasted. By the nature of such applications, a relatively thick film or stagnant layer is set up at the surface of the wet material, retarding diffusion of the wetting liquid to the outer more rapidly moving air. The result is that the increased rate of drying so achieved is either not sufficient for those applications where a high rate of liquid removal from relatively small areas is desired, or is otherwise unsatisfactory for many applications.

Pursuant to this invention, it has been found that a high rate of liquid removal per unit area may be achieved with a relatively low volumetric rate of flow by confining the surface of the wet material within passages having relatively small ratios of cross-sectional area over inside perimeter, herein called restricted passages, and causing a drying medium to flow through these passages with a high degree of turbulence.

One of the reasons for this is that, as mentioned above, the rate of liquid removal from a surface is affected by the thickness of a film or stagnant layer at the juncture of the wet surface and the drying medium.

The stagnant layer may be considered as a resistance to the transfer of liquid from the surface. The rate of liquid transfer through this layer increases as the thickness of the stagnant layer is decreased. At a critical value of a dimensionless number, termed the Reynolds number, whose value is dependent upon the cross-sectional dimensions of the passage and the velocity, density and viscosity of the drying medium within the passage, which will be hereinafter more fully explained, the flow in the passage changes from an orderly laminar flow to a turbulent one. This turbulent flow may be used to effectively decrease the thickness of this stagnant layer. However, this turbulent region alone is not enough to reduce the film thickness sufficiently for high rates of liquid transfer. High Reynolds numbers and, therefore, high turbulence may be achieved where, nevertheless, the film thickness remains relatively large and the corresponding rates of liquid transfer from the surface are small. There is another important factor in effecting the reduction in this film thickness. It is found that, as a practical matter, only when passages of relatively small cross-sectional dimensions are used in conjunction with these high Reynolds numbers does a sufficient reduction in film thickness occur to achieve a correspondingly high rate of liquid transfer from the surface. This invention, therefore, involves the use of passages and velocities dimensioned to operate within this desirable region of reduced film thickness. From this aspect, this invention may be considered to be a means for increasing liquid transfer between a surface and a drying medium by reducing the thickness of this film or stagnant layer.

The use of restricted passages also serves another important function in this invention. It insures a high volumetric rate of liquid removal for a relatively small volumetric rate of drying medium used. With restricted passages, all of the drying medium is made to flow sufficiently close to the drying surface to cause every portion of the medium to contribute to the drying phenomenon.

A present embodiment of the invention incorporates the above in a novel arrangement particularly adapted for the rapid drying of wet strip material, such as motion picture film. Such material, by its nature, is highly susceptible to injuries, as for example, distortion and breakage from stresses and temperature variations. Even microscopic amounts of distortion may destroy the value of the film because of the amplification of this distortion during subsequent enlargement as by projection on a screen. The problems are further complicated by the fact that extremely rapid drying, effected as explained above, has a severe cooling effect upon the drying material and may even cause injurious freezing temperature. These problems are overcome by providing a construction in a present embodiment for rigidly supporting and preventing injurious stresses upon the film during the drying operation, and, at the same time, maintaining the film at a desirable substantially even temperature. This construction consists generally of a cylindrical film-carrying member, such as a wheel, arranged to rotate freely, as on anti-friction bearings, and having a peripheral contour suitable for carrying the film. Annular fins integral with the side of the wheel are disposed to make contact with the inflowing drying medium of a suitable temperature to provide a heat exchanger for maintaining the periphery of the wheel and thereby the film in contact with it at a substantially even temperature. Maintaining an even temperature is also assisted by an insulated body structure for preventing temperature changes from external losses.

In the present embodiment, by providing preliminary rough and finish drying operation areas, each serviced by a separate restricted passage, and a baffle and roller guiding arrangement, nearly the entire periphery of the wheel has been successfully utilized for drying, thereby increasing the over-all rate of liquid removal for the unit. The roller and baffle arrangement has, at the same time, served another function, that of forming a third restricted passage arranged to expose the under side of the film as it leaves the wheel periphery, thereby insuring removal of any wetting liquid which may have remained on the back side of the film.

One of the reasons making possible the above desirable structural features in a compact rigid, light, efficient and readily manufacturable apparatus is the use of a laminar construction in the body portion.

In a second embodiment, the drying is effected by a plurality of restricted passages, each of which may be adjusted to obtain the most desirable cross-sectional passage dimensions for a particular drying material. A construction, which is desirable for many applications, wherein the high velocity drying medium is prevented from touching the drying material at the material entrance and exit, has been obtained. The second embodiment achieves this by providing a plurality of inlet ports at one side of the periphery of a material-carrying wheel and a plurality of outlet ports on the other side of the periphery of the wheel with the outlet ports being arranged in intermediate relation to the inlet ports. An adjustable barrier between each inlet and outlet port provides, at one of its ends, with the periphery of the wheel, an adjustable restricted passage as the only path of access between the inlet and outlet ports. Liberality in manufacturing tolerances of ports and flexibility in restricted passage adjustment is also achieved by providing resilient sealing members of material, such as flexible rubber, at these ports and barriers. These resilient sealing members also simplify the provision of a swinging door arrangement for ready access to the wheel.

The foregoing and other advantages, objects and features of the invention will be better understood from the following description taken in conjunction with the accompanying drawings wherein:

Fig. 1 is a front elevational view of a preferred embodiment of the invention;

Fig. 2 shows a cross-sectional view taken on line 2—2 of Fig. 1;

Fig. 3 is an enlarged cross-sectional view taken on line 3—3 of Fig. 1 showing a restricted passage;

Fig. 4 is a back view of the preferred embodiment;

Fig. 5 is a cross-sectional view of a restricted passage portion illustrating the general flow pattern;

Fig. 6 is a front elevational view of a second embodiment of the invention with cut-away sections;

Fig. 7 is a cross-sectional view taken on line 7—7 of Fig. 6;

Fig. 8 is a back view of the second embodiment with the plenum chamber cut away on line 8—8 of Fig. 7;

Fig. 9 is a partial cross-sectional view taken on line 9—9 of Fig. 6;

Fig. 10 is a partial cross-sectional view taken on line 10—10 of Fig. 6; and

Fig. 11 is a schematic view of a typical operating arrangement of the invention.

Referring to Figs. 1 to 4 in more detail, the exemplary device 11 has a main body 12 in the form of a container composed of a series of laminations. One of these forms a rectangular cover plate 13 made preferably of insulating material as, for example, Lucite, which, in this embodiment, is also transparent. The cover plate 13 is fitted over one face of a restricted passage plate 14, visible through the cover plate 13 in Fig. 1, and having a circular opening 15 located substantially centrally of the plate, which is made preferably of an insulating material as Lucite. The periphery of the circular opening 15 is recessed at one side to form a flow transfer port 16 and has an opening at the opposite side to provide outside boundaries 18 and 19 for outlet ports 20 and 22, and a circular recess 24 for guide roller clearance. The edge 26 of restricted passage plate 14 is above the outer edge 28 of the container 11 so as to provide one side of an elongated outlet passage 30. The other face of the restricted passage plate 14 is fastened, as by screws 32, to a rectangular mounting plate 34 which has ports 36 and 38, and, in its center, a circular raised hub portion 40 at the axis of which is located a hole 42. The mounting plate 34 is preferably of a light, rigid material, such as aluminum, for example.

Tightly fixed in the hole 42 is one portion of a wheel shaft 44. Another portion of the wheel shaft 44 extends into the center of the opening 15 in passage plate 14, and has mounted thereon and free to rotate on anti-friction bearings, as ball-bearings 46 and 48, a feed wheel 50, held in place by a nut 54 screwed on to a threaded portion on the end of shaft 44.

The feed wheel 50 is preferably made of a light material having good heat-conducting properties, as, for example, aluminum. On the side of feed wheel 50 facing the mounting plate 34 are a series of concentric grooves 56 aligned with the ducts 36 and 38. The other side of the feed wheel 50 has an intermediate relief portion 58 for minimizing its weight. The periphery of the feed wheel 50 has a groove 60 (see Fig. 3) with the shoulder 62 on the plate 13 side of the wheel lower than the shoulder 64 on the other side of the groove to facilitate inserting the material to be dried. The clearance between circular passage plate opening 15 and the periphery of the feed wheel 50 provides a restricted passage 66 having dimensions which will be hereinafter more fully explained.

Fitting around the hub 40 and against the other side of the mounting plate 34 is a rectangular duct plate 68 made of insulating material as, for example, Lucite, and having its outside edges coinciding with the outside edges of the mounting plate 34. The duct plate 68 also has openings 70 and 72 coinciding with openings 36 and 38, respectively, in mounting plate 34.

Fitted against the duct plate 68 is a back plate 74 made of insulating material, such as Lucite, and being of rectangular shape such that its outside edges coincide with the outside edges of the duct plate 68. The back plate 74 has a hole 76 at its center located over the mounting hub 40. Another opening 78 coincides with openings 70 and 36, all of which open into the inlet 80 provided by the fitting 82 which has a shoulder 84 for securing it against the cover plate 74, as by screws 86, which preferably extend into the mounting plate 34. The plates 68 and 74 are fastened to mounting plate 68 as by screws 87. Screw and thumb nut fastenings 88 at spaced intervals about the feed wheel opening 15 are used to secure the cover plate 13 in place during operation. The thumb nut fastenings provide a ready means for removing the cover plate 13 for access to feed wheel 50. The entire assembly may be kept in proper alignment by dowels 89.

A flow discharge baffle 90 of the same thickness as the passage plate 14 is inserted at the lateral opening of the passage plate 14 to form boundaries for the two outlet ports 20 and 22, and the elongated outlet passage 30. The baffle 90, held in place as by screws 91, has its end 92 closely fitting the groove 60 of feed wheel 50 to provide effective separation of ports 20 and 22.

Roller 96, arranged free to rotate on antifriction bearings, is inserted in outlet passage 20 to provide a feed guide for the material to be dried, as motion picture film 98. Rollers 100, 102, and 104, similar to roller 96, and similarly mounted, provide guides for the film 98 leaving the apparatus.

In operation, wet motion picture film 98, for example, from a developing and washing apparatus 99 (Fig. 11), is guided into the groove 60 of feed wheel 50 over guide roller 96, preferably with the wet emulsion side facing the restricted passage 66. The film 98 is led away from the feed wheel 50 over guide roller 100 and turned over to expose its back side to the passage 30 by guide rollers 102 and 104. From guide roller 104 it is led away from the apparatus properly dried. The film may be pulled through the apparatus, preferably at a constant speed, by any suitable means. For example, a film winding sprocket or spool 101 (see Fig. 11), driven by any suitable motor 103, preferably with speed control, may be used. Because of the above construction, only a relatively small pull is needed to move the film through the apparatus.

Heated air, as the drying medium in this instance, from any suitable source as, for example, a blower 105 (see Fig. 11), operated by a motor 107, preferably with speed control, and a controlled heater 109, is made to flow through inlet duct 80 to the grooves 56. It flows through grooves 56 in both directions around the side of the feed wheel 50, thereby maintaining the wheel at an even temperature which, in turn, maintains the motion picture film about the wheel 50 at nearly the same temperature. The amount of heat transferred to the wheel compensates for the cooling effect from the drying operation. It should be understood here that, while this novel heat exchanger arrangement has been used in the present embodiment, the invention is not limited to such arrangement and that other means for maintaining proper wheel temperature may also be used as, for example, electric heating elements. From the grooves 56 the air flows through openings 72 and 38 to the transfer duct 16, from whence it flows with a high degree of turbulence in both directions through the restricted passage 66, thereby exposing the photographic film 98 carried on the wheel 50 to the high drying action of this turbulent flow. Rough drying occurs in the direction of outlet port 20 and finish drying in the direction of outlet port 22. The rough drying air is then allowed to escape through outlet 20. To insure removal of any small amount of moisture that might remain on the under-side of the film 98, the turbulent air is made to pass over the bottom side of the film in the passage 30 before it is allowed to escape.

While, in the present embodiment, air has been used in the restricted passage 66 as the drying medium, other gases may also be used provided dimensioning of the passages is accordingly altered, as hereinafter explained.

In the following analysis, symbols used are defined in the table below and constants, used in the present embodiment, are given where applicable. Where the use of other gases is desired, the following analysis is applicable provided the constants for the particular gas under operating conditions are inserted in place of those for air.

$A$ = area normal to direction of diffusion in square feet $B$ = thickness of stagnant layer in feet $D$ = equivalent diameter of a cross section of the restricted passage in feet $$D = 4\frac{s}{p} \text{ ft.}$$

$E$ = rate of mass transfer, in lb./hr.

$p$ = perimeter of a cross section of the restricted passage in feet $R$ = gas constant For water vapor $R = 4.05 \times 10^{-2}$ expressed in $\dfrac{\text{ft.}^3 \text{ atmosphere}}{\text{degree Rankin, lb. water}}$ $Re$ = Reynolds number, dimensionless, defined as $$\frac{DV\rho}{\mu}$$

$s$ = restricted passage cross section in square feet $T$ = temperature in degrees Rankin = 460 + degrees Fahrenheit $V$ = velocity of the drying medium in the restricted passage in ft./sec.

$\delta$ = molecular diffusivity in ft.²/hr.

For water vapor in air at 100° F., $\delta = .94$ (approximate)

$\mu$ = viscosity in lb./ft.-sec. = $1.29 \times 10^{-5}$ for air at 100° F. (approximate)

$\rho$ = density of gas in the passage in lb./ft.³ = $7.1 \times 10^{-2}$ for air at one atm. and 100° F. (approximate)

$\phi$ = partial pressure in atmospheres

The flow through the restricted passages will be laminar or turbulent depending generally upon the cross-sectional dimensions of the passage, the density and velocity, and inversely as the viscosity of the drying medium used. A characteristic variable which determines whether the flow will be laminar or turbulent is a dimensionless coefficient called the Reynolds number. The general relation is:

$$Re = \frac{DV\rho}{\mu}$$

The flow is laminar for Reynolds numbers below 2200 and turbulent for values above 2200. Around 2200 there is an undetermined region in which both turbulent and laminar flow may exist. For laminar flow, any given boundary line in the drying medium continues as a stream line in the same relative position to the wall. In turbulent flow, there is considerable motion in the drying medium with eddies that move perpendicular to the net flow and no definite boundary lines are maintained. However, even in turbulent flow a laminar boundary layer exists at the wall. At this laminar layer, probably because of its relatively slow moving and orderly stream lines, there may be considered as existing a stagnant layer as far as diffusion of the wetting liquid from the film surface to the turbulent core is concerned. This is illustrated in Fig. 5 where 106 is a greatly exaggerated cross-sectional view of a stagnant layer, 108 are opposite walls of a restricted passage, 110 is a turbulent core whose average velocity V is in the direction of the arrows and 112 is a small film of wetting liquid comparable, in this instance, to the wetting liquid of the motion picture film. The thickness B of the stagnant layer 106 is affected by the Reynolds number and the equivalent diameter D of the restricted passage, and for turbulent flow may be expressed by the relation $$\frac{1}{B} = .023 \frac{Re^{.83}}{D} \frac{(3600\mu)^{.44}}{\rho \delta}$$

It should be noted that both Reynolds number Re and equivalent diameter D of the restricted passage have an effect on the thickness of this stagnant layer.

The general relation for steady state diffusion of a vapor "a" of liquid 112 through the stagnant layer 106 to the turbulent core of drying medium "b" may be expressed:

$$E_a = \frac{A\delta(\phi_a + \phi_b)}{RTB}\left(\frac{\phi_{a1} - \phi_{a2}}{\phi_{bm}}\right)$$

where $\phi_{bm}$ is the log mean partial pressure difference $$\phi_{bm} = \frac{\phi_{b2} - \phi_{b1}}{\ln\left(\frac{\phi_{b2}}{\phi_{b1}}\right)}$$

and $\phi_{a1}$ and $\phi_{b1}$ are the respective partial pressures taken at any point 116 at the liquid 112 surface and $\phi_{a2}$ and $\phi_{b2}$ are the respective partial pressures at any point 114 at the juncture of the stagnant layer 106 and core 110.

Applying this to the present embodiment, where water is being removed by air as the drying medium, the rate of diffusion of water vapor through the stagnant layer 106 at any point may be shown to follow the relation $$\frac{E}{A} = \frac{\delta(\phi_2 - \phi_1)}{BTR} \cdot \left[\frac{1}{1 - \phi_m}\right]$$

where $\phi_1$, varying along the length of the drier, is the partial pressure of water vapor in the air stream at point 114, $\phi_2$ is at 100% relative humidity at point 116, and $\phi_m$ is the logarithmic mean of $\phi_1$ and $\phi_2$. The actual rate of liquid removal is somewhat larger because some liquid is removed in droplet form by the high velocity flow without being evaporated. In this instance, where a total pressure of one atmosphere is maintained, $\phi_m$ is much smaller than one and therefore $$\left[\frac{1}{1 - \phi_m}\right]$$

may be dropped out of the above equation. If, for example, an operating range around 100° Fahrenheit is used, the ratio $$\frac{\delta}{T}$$

is found to remain nearly constant and the above equation becomes $$\frac{E}{A} = \frac{\delta(\phi_2 - \phi_1)}{560 BR}$$

It is seen, therefore, that B has an effect only on E and that, by reducing B, the rate of diffusion to the turbulent core is increased. Because of the turbulence in the core, a much more rapid rate of diffusion, termed "eddy" diffusion, exists in the turbulent core and the water vapor is rapidly carried away by the high core velocity. The chief resistance to diffusion thus exists at the stagnant layer.

One of the factors in the present invention, therefore, is to operate well above the critical Reynolds number of 2200, preferably at Reynolds numbers of at least 3000, to insure a small stagnant layer thickness and a high diffusion rate. This range may be expressed $$3000 \leq \frac{DV\rho}{\mu}$$

As mentioned above, the effective diameter of the restricted passage has an effect upon the thickness of the stagnant layer. By replacing Re by $$\frac{DV\rho}{\mu}$$

in the above stagnant layer equation, it reduces to:

$$\frac{1}{B} = \left(\frac{V^{.83}}{D^{.17}}\right)\left(\frac{.023 \rho^{.39}}{\mu^{.39} \delta^{.44}}\right)$$

Thus the two most conveniently controlled factors, the velocity V and the effective passage diameter D, both have an effect upon stagnant layer thickness, with the velocity having generally a greater effect than the effective diameter D. Therefore, even for large effective diameters, a desirably small stagnant layer thickness B may still be achieved by increasing the velocity V. However, by increasing the effective diameter D and the velocity V to compensate for this increased diameter, several other things occur. The volumetric flow of drying medium is increased which thereby increases power and size requirements of apparatus for moving the increased quantities of drying medium. Also, as already mentioned, as the effective diameter becomes large with respect to the velocity, the amount of liquid removal per unit volume of drying medium is decreased. Pursuant to the present invention, it has been found that, in the embodiments herein described, most effective operation is obtained where the passages are restricted to those having effective diameters of less than .166 foot and preferably below .033 foot. The relation of D to the ratio of the cross-sectional area over cross-sectional perimeter of the restricted passage is $$D=4\frac{s}{p}$$

Thus, the ratios of $$\frac{s}{p}$$

corresponding to $D$=.166 and .33 foot are .0415 and .00825 foot, respectively. Restricted passages with ratios of cross-sectional area over cross-sectional perimeter smaller than .0415 foot may be expressed mathematically $$.0415 > \frac{s}{p}$$

and for ratios below 0.00825 foot may be expressed $$.00825 > \frac{s}{p}$$

From the relation $$D = 4\frac{s}{p}$$

and the relation $$3000 > \frac{DV\rho}{\mu}$$

the expression of minimum velocity of the drying medium in the restricted passage becomes:

$$V > \frac{750\mu}{\frac{s}{p}\rho}$$

The operating velocities used in some instances have been, for example, over 400 miles per hour, and 35 mm. motion picture film has been dried over a 16-inch diameter feed wheel at 90 feet per minute despite such relatively low film temperatures as 100° Fahrenheit.

Figs. 6 to 9 show a second embodiment wherein a plurality of short restricted passages are used. In this embodiment, the material to be dried, as motion picture film 98, enters the drier 117 through the opening 118 and passes over guide roller 119, which may be similar to the guide roller 100, and free to rotate on a spindle 120 fixed to a mounting plate 122, preferably made of a light, rigid material, such as aluminum. The film 98 then passes over the periphery 124 of a feed wheel 126, which is mounted free to rotate on anti-friction bearings 128, indicated in dotted lines in Fig. 7. Upon leaving the wheel periphery 124, the film 98 again passes over guide rollers 129 and 130, similar to the guide roller 119, and similarly mounted. The feed wheel 126 is held in place through anti-friction bearings 128 on a wheel shaft 130 between a shoulder 132 and nut 134 screwed on to the end of wheel shaft 130. The shaft 130 is fixed to a shaft support member 136 by shoulder 132 and nut 138. The shaft support member is fastened in place at the center of mounting plate 122 as by screws 140. An insulating cover plate 142, preferably of insulating material, as Lucite, is fixed to the outside of the mounting plate 122 by screws 144. Screws 144 also hold in place a plenum chamber 146 having an inlet 148 for receiving a drying medium under pressure, as from blower 105 (Fig. 11). Mounting plate 122 and insulating plate 142 have inlet ports 150, shown in Figs. 8 and 10, for admitting the drying medium from the plenum chamber 146 to chambers 152 about the periphery 124 of the feed wheel 126. The chambers 152 are formed between barriers 154. The barriers 154 are made adjustable by elongated openings 156 for receiving screws 158 which hold barriers 154 in place against the mounting plate 122. Resilient sealing members 160 made of such material as, for example, rubber are fixed as by cementing to the front ends of the barriers 154 and are of a thickness to fit firmly against a cover plate 162 made preferably of an insulating material, such as Lucite, which in this instance is also transparent. The cover plate 162, shown partially cut away in Fig. 6, has outlet ports 164 which are spaced in intermediate relation with inlet ports 150 and are separated from inlet ports 150 by barriers 154. Between the cover plate 162 and the mounting plate 122 is a spacer plate 166 made preferably of insulating material and fixed to the mounting plate 122, as by screws 168. Between periphery 170 (see Fig. 6) of a circulatr opening located substantially centrally of the spacer plate 166 and the tops 172 of the barriers 154 are located resilient sealing members 174 of such material, for example, as sponge rubber. Because of sealing members 174, barriers 154 and sealing members 160, chambers 176 (see Figs. 9 and 6) having outlet ports 164 are formed about the periphery 124 of feed wheel 126 and the only access between chambers 152 and 176 are small, adjustable, restricted passages 178 directly above the film 98 on the periphery 124 of feed wheel 126. Thus, the drying medium entering the plenum chamber 146 will go through inlet ports 150 into chambers 152. From chambers 152 the drying medium is caused to flow through restricted passages 178 over film 98 into chambers 176 and it is then allowed to escape through outlet ports 164. A baffle plate 180, a cut-away section of which appears in Fig. 6, in this instance made of transparent Lucite, and attached as by a screw and lug arrangement 182 to the cover plate 162, deflects outflowing drying medium as it leaves the outlet passages 164. To facilitate rapid insertion of the film 98 on the periphery 124 of feed wheel 126, the cover plate 162 has been attached, by by screws 184, to a hinge 186 fixed to one end of the drier. Top clamp 188, bottom clamp 189, and a pivoted screw and wing-nut arrangement 190 are used to secure the cover plate 162 firmly in place against the resilient members 174 and 160 to insure a tight seal. To insure additional support to the cover plate against operating pressures of the drying medium, a centrally located support plate 192, preferably of a rigid metallic material, is attached to the cover plate 162, as by screws 194, and provides additional support to the cover plate 162 by means of a thumb screw 196 screwed into a threaded hole in the end of shaft 132, as shown.

A baffle 198, shown in Fig. 6 and partially cut away in Fig. 7, is arranged between mounting plate 122 and cover plate 162 with its top portion 200 closely fitting the wheel periphery 124, and effectively separates the wet film entering the drier from the dry film leaving the drier. The baffle 198 may be attached in place by a lug 202 and screws 204 in mounting plate 122.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An apparatus for drying wet material comprising a container having an inlet, an intermediate duct passage and an outlet; a wheel disposed to rotate within said container, the peripheral face of said wheel having a contour suitable for carrying said material, and a side of said wheel having grooves to form passages connecting said inlet and said duct; means having a restricted passage about the periphery of said wheel, said restricted passage means connecting said duct and said outlet and dimensioned with respect to velocity flow of a drying medium in said restricted passage to produce turbulence in said flow thereby effecting a high rate of drying of said material.

2. An apparatus for drying wet material comprising a container having an inlet for admitting a drying medium at one pressure, an intermediate duct passage and an outlet for discharging said drying medium at a different pressure; a wheel disposed to rotate within said container, the periphery of said wheel having a contour suitable for carrying said material and at least one side of said wheel having grooves to form passages connecting said inlet and said duct; restricted passage means about the periphery of said wheel, said periphery providing a wall of said restricted passage means, said restricted passage means connecting said duct and said outlet and dimensioned with respect to velocity flow in said restricted passage to produce turbulence in said flow, thereby effecting a high rate of drying of said material.

3. An apparatus for drying wet material, an insulated container having an inlet for admitting a heated drying medium, an intermediate duct passage and two outlets for discharging said drying medium, a wheel disposed to rotate within said container, the periphery of said wheel having a contour suitable for carrying said material from one of said outlets to the other of said outlets and at least one side of said wheel having grooves to form passages between said inlet and said duct, restricted passage means about the periphery of said wheel, said periphery providing a wall of said restricted passage means, said restricted passage means connecting said duct and said outlets and of a dimension with respect to velocity flow of said drying medium to produce turbulence in said flow, thereby effecting a high rate of drying of said material.

4. An apparatus as in claim 3 additionally having guide means at said outlets, said guide means being disposed to direct said material firmly against said periphery.

5. An apparatus as in claim 3 additionally having a baffle at said outlets disposed to form another restricted passage and guide means in said last-mentioned restricted passage for turning said material over, thereby exposing the other side of said material to said drying medium.

LEONHARD KATZ.

References Cited in the file of this patent
UNITED STATES PATENTS

| Number | Name | Date |
| --- | --- | --- |
| 1,724,645 | De Long | Aug. 13, 1929 |
| 1,830,287 | Ohlin | Nov. 3, 1931 |
| 2,268,988 | Hess et al. | Jan. 6, 1942 |
| 2,297,726 | Stephanoff | Oct. 6, 1942 |
| 2,501,875 | Rayburn | Mar. 28, 1950 |